(12) United States Patent
Gotti et al.

(10) Patent No.: US 6,247,562 B1
(45) Date of Patent: Jun. 19, 2001

(54) DISK FOR A DISK BRAKE

(75) Inventors: Giovanni Gotti, Alme'; Leone Oberti, Lenna, both of (IT)

(73) Assignee: Freni Brembo S.p.A. (IT)

( * ) Notice: Subject to any disclaimer, the term of this patent is extended or adjusted under 35 U.S.C. 154(b) by 0 days.

(21) Appl. No.: 09/395,031

(22) Filed: Sep. 13, 1999

(30) Foreign Application Priority Data

Sep. 17, 1998 (IT) .................................................. 98830541

(51) Int. Cl.[7] .................................................. F16D 65/10
(52) U.S. Cl. .................................. 188/218 XL; 301/6.1; 301/6.91; 74/574; 188/73.37; 188/264 G
(58) Field of Search .................. 188/218 XL, 73.36, 188/73.37, 205 A, 18 A, 264 G; 301/6.1, 6.8, 6.91; 74/574; 280/86.753

(56) References Cited

U.S. PATENT DOCUMENTS

| | | | |
|---|---|---|---|
| 3,455,180 | 7/1969 | Wagenfuhrer | 74/574 |
| 3,602,339 * | 8/1971 | Sontheimer | 188/18 A |
| 5,007,508 | 4/1991 | Lacombe | 188/251 A |
| 5,074,578 * | 12/1991 | Grove et al. | 280/86.753 |
| 5,108,156 * | 4/1992 | Bell | 301/6.1 |
| 5,383,678 * | 1/1995 | Sokol | 280/86.753 |
| 5,746,292 * | 5/1998 | Tanaka et al. | 188/73.37 |
| 5,918,707 * | 7/1999 | Saunders, III | 188/18 A |
| 6,035,507 * | 3/2000 | Bianchi | 188/18 A X |

FOREIGN PATENT DOCUMENTS

| | | |
|---|---|---|
| 1775685 | 9/1971 | (DE) . |
| 43 38 593 A1 | 5/1995 | (DE) . |
| 94 22 141 U 1 | 4/1998 | (DE) . |
| 0 548 700A1 | 6/1993 | (EP) . |
| 0 872 659 A1 | 10/1998 | (EP) . |
| 2 479 382 | 10/1981 | (FR) . |
| 2 698 425 | 5/1994 | (FR) . |

\* cited by examiner

*Primary Examiner*—Robert J. Oberleitner
*Assistant Examiner*—Pamela J. Rodriguez
(74) *Attorney, Agent, or Firm*—Townsend and Townsend and Crew LLP

(57) ABSTRACT

A disk for a disk brake which achieves an unusual vibration-damping capability and consequently a more comfortable ride comprises a braking ring and a bell having respective flanges clamped together with nut-and-bolt assemblies, as well as a plate clamped between the flanges by the nut-and-bolt assemblies.

1 Claim, 3 Drawing Sheets

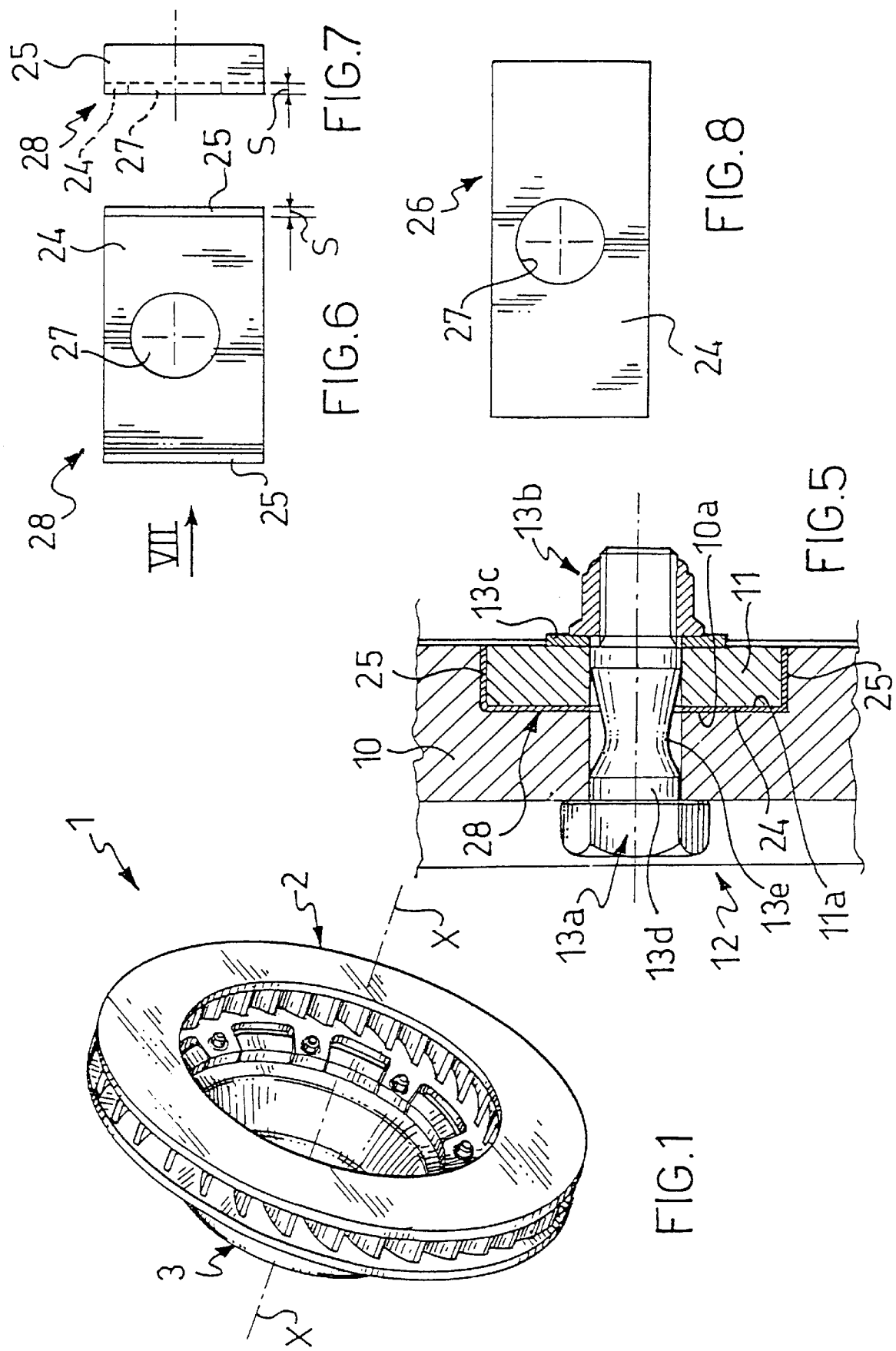

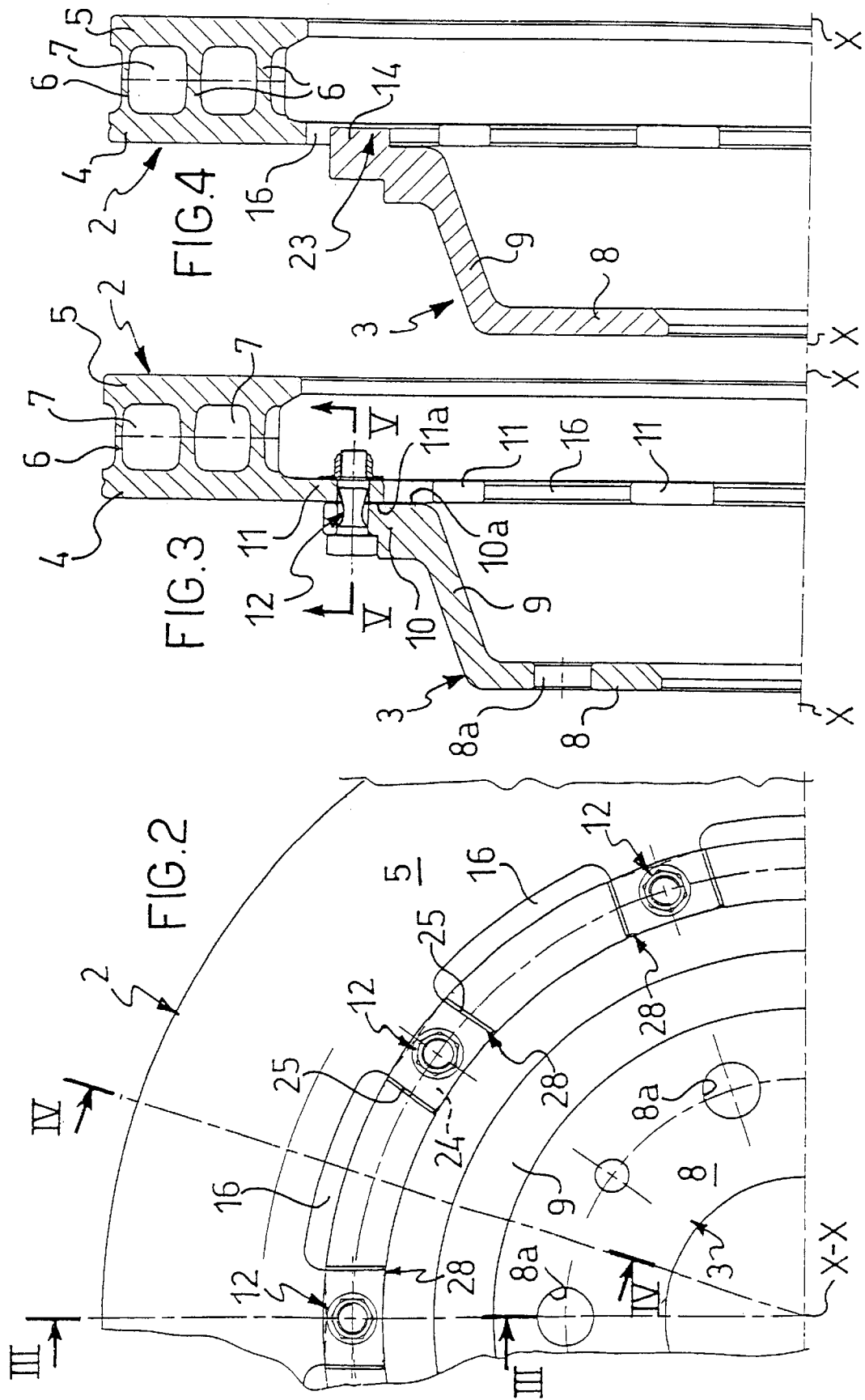

DISK FOR A DISK BRAKE

FIELD OF THE INVENTION

The present invention relates to a disk for a disk brake, of the type comprising a braking ring and a bell having respective flanges clamped together by means of nut-and-bolt assemblies.

BACKGROUND OF THE INVENTION

These discs are subject to vibrations which result in annoying whistling.

The problem upon which the present invention is based is that of devising a disk of the type specified which has structural and functional characteristics such as to overcome the above-mentioned disadvantage.

SUMMARY OF THE INVENTION

This problem is solved by a disk of the type specified which is characterized in that it comprises a plate clamped between the flanges by the nut-and-bolt assemblies.

BRIEF DESCRIPTION OF THE DRAWINGS

Further characteristics and the advantages of the disk according to the present invention will become clear from the following description of a preferred embodiment thereof, given by way of non-limiting example, with reference to the appended drawings, in which:

FIG. 1 is a perspective view of a disk according to the present invention,

FIG. 2 is a front view of a detail of the disk of FIG. 1,

FIG. 3 is a side view showing the detail of FIG. 2, sectioned on the line III—III, FIG. 4 is a side view showing the detail of FIG. 2 sectioned on the line IV—IV, FIG. 5 shows a detail of the disk of FIG. 2 sectioned on the line V—V of FIG. 3, FIG. 6 is a front view of a detail of the disc of FIG. 1, FIG. 7 is a side view of the detail of FIG. 6 taken on the arrow VII, FIG. 8 shows a flat blank for producing the detail of FIG. 6.

DETAILED DESCRIPTION OF THE INVENTION

Figure 9:
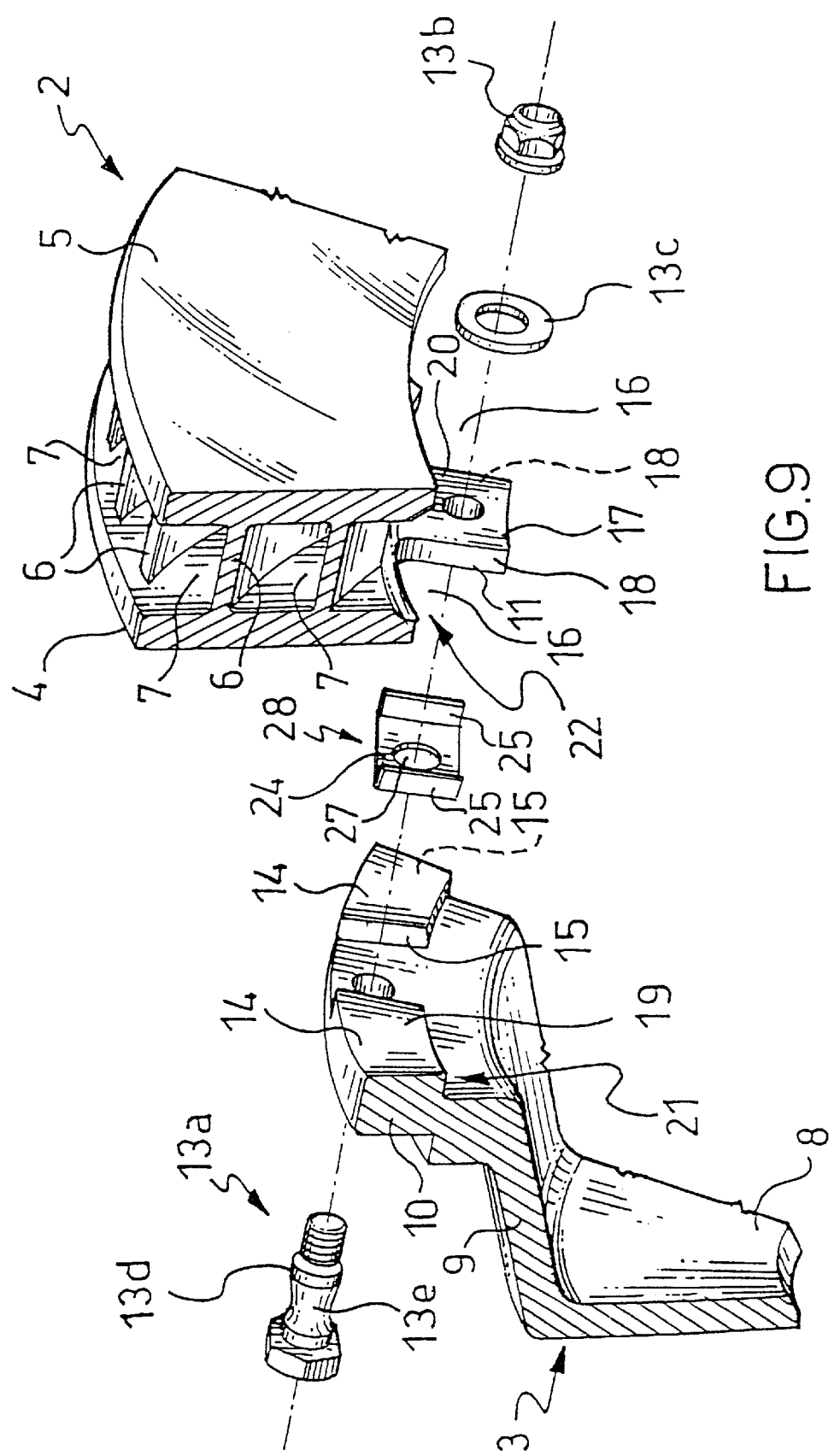
FIG. 9 is a perspective view of the disk brake of FIG. 1 in partial section with parts separated.

With reference to the appended drawings, a disk for a disk brake of axis X-X is generally indicated 1.

The disk 1 comprises a braking ring 2 and a bell 3, coaxial with one another on the axis X-X.

The braking ring 2 is preferably cast in a suitable cast iron and, in the embodiment shown, comprises an outer ring 4, an inner ring 5, and a plurality of spacer fins 6 extending between the rings 4 and 5 and defining ventilation ducts 7 in the braking ring 2.

The bell 3 is preferably made of a light alloy, for example, cast aluminum alloy and comprises an annular base wall 8 provided with holes 8a for bolts, not shown in the drawing, for clamping the disc 1 to a wheel hub, likewise not shown. The bell 3 comprises a frusto-conical skirt 9 connected to the base wall 8 and diverging towards a periphery of larger diameter for fixing to the braking ring 2.

In particular, the bell 3 comprises, on the said periphery, a flange 10 a face 10a of which is placed close to a face 11a of a flange 11 projecting from the braking ring 2 and, more precisely, projecting from the outer ring 4 of the braking ring and coplanar therewith.

The flanges 10 and 11 are fixed together by means of a plurality of nut-and-bolt assemblies 12 of which there are ten in the embodiment shown, arranged at intervals around a circle. Each nut-and-bolt assembly 12 comprises a bolt 13a and a nut 13b, complete with a washer 13c.

Preferably, each bolt 13a has a shank 13d which comprises a portion 13e of reduced cross-section giving the bolt resilience.

Teeth 14, identical to each other, projecting from the face 10a of the flange 10 in the direction X-X and having opposed sides 15, are arranged at regular intervals around a circle and intercalated between the nut-and-bolt assemblies 12.

Windows 16 formed in the flange 11 are of a size such as to house the teeth 14 and define in the flange 11 a corresponding number of flange sectors, indicated 17, and having opposed sides 18.

At this point it is easy to understand that the teeth 14 and the flange sectors 17 constitute teeth, indicated 19 and 20, of respective engaged half couplings 21 and 22 of a coupling 23 formed between the bell 3 and the braking ring 2 for improving the fixing of the bell and the braking ring for rotation with one another by virtue of the mutual engagement of the sides 15 and 18.

It should be noted that, according to the invention, a substantially rectangular plate, indicated 24, which is elongate in a peripheral direction, is provided between the juxtaposed faces 10a and 11a of the flanges 10 and 11 in the region of each nut-and-bolt assembly and is clamped between the two faces 10a and 11a by the respective nut-and-bolt assembly 12.

The plate 24 has a thickness S of between 0.05 mm and 2 mm and preferably has a thickness of 0.5 mm.

It should be noted that each plate 24 preferably has at its ends, in the peripheral direction, two flanges bent at right angles and indicated 25.

The plate 24 and the flanges 25 are preferably produced from a rectangular flat blank 26 of a suitable material which will be described below, having a hole 27 through which the bolt 13a can extend. The plate 24 and its flanges 25 are produced by bending the ends of the blank 26 at right angles.

The flanges 25 of the plate 24 are housed with limited clearance between the facing sides 15 and 18 of the teeth of the coupling so that contact between these sides takes place via these flanges 25.

The invention thus provides an insert 28 easily produced from a flat blank 26, comprising the plate 24 and the flanges 25, and capable of being fitted on the disk 1 between the bell 3 and the braking ring 2 in the region of each bolt.

The contact between the braking ring and the bell thus takes place via the inserts 28; more precisely, the contact between the flanges takes place via the plate 24 and the contact between the sides of the teeth takes place via the flanges 25. Direct contact between the braking ring and the bell is thus avoided and, instead, it is ensured that this contact takes place via the material of the insert 28.

If the disk 1 does not have a coupling 23, the plate 24 takes the form of a ring matching the annular shape of the flanges 10 and 11.

The insert 28, that is, the plate 24 with its flanges 25, is advantageously made of a metallic material, for example, steel.

According to a variant of the invention, the material of the insert is advantageously constituted by a pack of closely juxtaposed thin metal sheets, for example, ten steel sheets each 0.05 mm thick. Packs of thin metal sheets are normally available on the market under the trade name LAMINUM.

According to another variant of the invention, the material of the insert is advantageously a composite material formed by a layer of nitrile rubber 0.14 mm thick, a layer of steel 0.4 mm thick, and a layer of nitrile rubber 0.14 mm thick, with a total thickness of 0.68 mm. A composite material of this type is normally available on the market under the trade name TRELLEBORD RUBORE.

In operation, by virtue of the presence of the insert 28, it has been found that the vibrations are diminished to the extent of elimination.

The main advantage of the disk according to the invention lies in the fact that it is vibration-free and achieves an unusually comfortable ride.

A further advantage of the disk according to the present invention lies in the fact that it has a simple structure which can therefore be expected to operate faultlessly throughout the life of the disk.

Naturally, in order to satisfy contingent and specific requirements, an expert in the art may apply to the disk according to the above-described embodiment many modifications all of which, however, are included within the scope of protection of the invention as defined by the following claims.

What we claim is:

1. A disk for a disk brake, of the type comprising a braking ring and a bell having respective flanges clamped together by means of nut-and-bolt assemblies,
    wherein the disk comprises at least one plate clamped between the flanges by the nut-and-bolt assemblies;
    wherein the number of plates is equal to the number of nut-and-bolt assemblies; and
    wherein each plate has flanges bent at right angles and inserted between sides of teeth of a coupling formed between the flanges.

* * * * *